(12) United States Patent  
Wilhelm

(10) Patent No.: US 9,045,090 B2
(45) Date of Patent: Jun. 2, 2015

(54) PORTABLE WATER SPORT BOARD RACK

(71) Applicant: Timothy Wilhelm, Oklawaha, FL (US)

(72) Inventor: Timothy Wilhelm, Oklawaha, FL (US)

(*) Notice: Subject to any disclaimer, the term of this patent is extended or adjusted under 35 U.S.C. 154(b) by 19 days.

(21) Appl. No.: 13/959,278

(22) Filed: Aug. 5, 2013

(65) Prior Publication Data
US 2015/0034578 A1 Feb. 5, 2015

(51) Int. Cl.
A47F 7/00 (2006.01)
B63B 35/00 (2006.01)
B60R 7/00 (2006.01)
B60R 9/12 (2006.01)
A47B 81/00 (2006.01)
B63B 35/85 (2006.01)
A47F 5/02 (2006.01)

(52) U.S. Cl.
CPC .............. *B60R 9/12* (2013.01); *A47B 81/005* (2013.01); *B63B 35/85* (2013.01); *A47F 5/02* (2013.01); *A47F 7/0028* (2013.01); *A47F 7/0021* (2013.01)

(58) Field of Classification Search
CPC ....... A47F 7/0028; A47F 5/02; A47F 7/0021; A47F 7/0035; A47F 5/04; A47F 5/06; A47B 81/005; A47B 81/00; A47B 49/00; A63B 71/0036; B63B 17/00; B63B 21/60; B63B 35/7946; B63B 21/54; B63B 35/79; B63B 35/85; B63B 2035/855; B63B 2035/818; B63B 2035/715; A63C 11/028; A47G 25/0664; B60R 9/08; B60R 9/12
USPC ........ 211/85.1, 70.5, 70.2, 70.8, 63, 60.1, 66, 211/68, 70.7, 70.6, 59.4, 196, 205, 70, 163, 211/175; 114/364, 347, 343, 382; 224/406, 224/521, 531, 534, 917.5; 248/220.21, 248/220.22, 222.51, 222.52, 218.4, 219.4
See application file for complete search history.

(56) References Cited

U.S. PATENT DOCUMENTS

| | | | | |
|---|---|---|---|---|
| 3,701,436 A * | 10/1972 | Adams | ......................... | 211/70.5 |
| 3,802,297 A | 4/1974 | Schiler | | |
| 3,836,058 A * | 9/1974 | Penniman et al. | ............ | 224/315 |
| 3,848,785 A * | 11/1974 | Bott | ............... | 224/319 |
| 4,081,118 A * | 3/1978 | Mason | ......................... | 224/324 |
| 4,232,806 A * | 11/1980 | Shald | ............. | 224/406 |
| 4,274,571 A * | 6/1981 | Lafreniere et al. | ............ | 294/147 |
| 4,582,015 A * | 4/1986 | Hunter | ......................... | 114/343 |
| 4,778,141 A | 10/1988 | Bogar | | |
| 4,863,082 A * | 9/1989 | Evans et al. | .................... | 224/406 |
| 5,582,044 A * | 12/1996 | Bolich | ............. | 70/58 |
| 5,752,638 A * | 5/1998 | Meeks | ......................... | 224/547 |
| 5,788,133 A * | 8/1998 | Mareno | ......................... | 224/406 |
| 5,884,781 A * | 3/1999 | Ehrhart | ......................... | 211/70.5 |
| 5,906,304 A * | 5/1999 | Baldacchino | ................. | 224/406 |
| 5,979,102 A * | 11/1999 | Sagryn | ......................... | 43/21.2 |
| 6,019,265 A * | 2/2000 | Deloza | ......................... | 224/405 |
| 6,863,199 B2 * | 3/2005 | Child | ............. | 224/408 |
| D508,455 S * | 8/2005 | Oakley et al. | ................ | D12/317 |
| 7,370,599 B1 * | 5/2008 | Berman et al. | ................. | 114/364 |

(Continued)

*Primary Examiner* — Jennifer E Novosad
(74) *Attorney, Agent, or Firm* — Jason T. Daniel, Esq.; Daniel Law Offices, P.A.

(57) ABSTRACT

A portable water sport board rack includes a pair of generally parallel forks each including a plurality of elongated prongs that define channels for receiving and storing water-sport boards. The forks are transversely connected via a support cross member, and an extension member connects the cross member to a rotational unit. An elongated rod is secured to the bottom of the rotational unit at an angle, and the device is secured to a boat through insertion of the angled rod into a rod holder.

14 Claims, 11 Drawing Sheets

(56) References Cited

U.S. PATENT DOCUMENTS

| | | | |
|---|---|---|---|
| 7,670,201 B2* | 3/2010 | Winter | 440/109 |
| 8,757,399 B2* | 6/2014 | Wolfbauer | 211/70.8 |
| 2005/0155999 A1* | 7/2005 | Gasper | 224/406 |
| 2006/0037527 A1* | 2/2006 | Aff | 114/364 |
| 2007/0057000 A1* | 3/2007 | Webster | 224/521 |
| 2007/0062992 A1* | 3/2007 | Hepworth et al. | 224/406 |
| 2007/0209567 A1* | 9/2007 | Fee et al. | 114/343 |
| 2010/0147712 A1* | 6/2010 | Filho et al. | 206/315.1 |
| 2013/0047907 A1* | 2/2013 | Pimental | 114/253 |
| 2014/0021155 A1* | 1/2014 | Ferre-Rangel et al. | 211/182 |

* cited by examiner

PORTABLE WATER SPORT BOARD RACK

TECHNICAL FIELD

The present invention relates generally to boating accessories, and more particularly to a portable rack for transporting and storing watersport equipment such as wakeboards and water skis.

BACKGROUND

The statements in this section merely provide background information related to the present disclosure and may not constitute prior art.

Water sports involving boards such as wakeboarding, skiing, and knee boarding, for example, are among the most popular boating activities in the United States. Owing to the size of these boards and the cramped space of most boats, ski racks have become increasingly popular in recent years. To this end, conventional ski racks are typically permanently affixed onto the elevated tower of the ski boat and function as a shelf for storing the boards when they are not in use.

Although these racks are suitable for ski boats having an elevated tower, the vast majority of small boats used for skiing do not have towers. In these instances, boaters are forced to store the water sports equipment on the floor or other unsecured spaces within the boat, thereby posing a tripping hazard to the boat occupants and often times resulting in damage to the board or boards themselves.

Although some previous attempts have been made to provide a retrofit board rack, including U.S. Pat. No. 4,232,806, to Shald; and U.S. Pat. No. 4,582,015, to Hunter, each of these devices require the racks to be permanently or semi-permanently mounted onto the boat via clamps, screws and bolts, for example, thereby causing damage the vessel and possibly voiding the boat and/or hull warranty. Moreover, as these devices are typically secured in a permanent or semi-permanent manner, the known racks are not transferable from one boat to another without modification.

In addition to the above, because these racks are mounted to the outside portion of the boat, users are unable to safely load and transporting the boards within the rack prior to heading to the water, as the boards cannot safely travel at highway speeds hanging from the side of the boat being trailered.

Accordingly, it would be beneficial to provide a lightweight portable water sport board rack that does not suffer from the drawbacks of the above noted devices, can be utilized interchangeably with any type of boat and that does not require mounting hardware.

SUMMARY OF THE INVENTION

The present invention is directed to a portable water sport board rack. One embodiment of the present invention can include a pair of generally parallel forks each including a plurality of elongated prongs that define channels for receiving and storing watersport boards such as wakeboards, water skis, kneeboards, paddleboards and the like. The forks can be connected to a rotational unit via an extension member and cross support member. The rotational unit can allow the forks to rotate about a 360 degree axis, while maintaining the forks in a generally vertical orientation.

In one embodiment, an elongated rod can be connected to the bottom of the rotational unit and can be removably inserted into the rod holder of a boat or other such vessel and secured therein during operation of the boat and during a transport/trailering procedure.

In another embodiment, a plurality of straps can be provided to secure the water sports boards to the rack, and a handle can be provided to allow a user to carry the rack and boards from one location to another.

In yet another embodiment, the rack can include a unitary construction wherein the rod is affixed directly to the end of the extension member.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
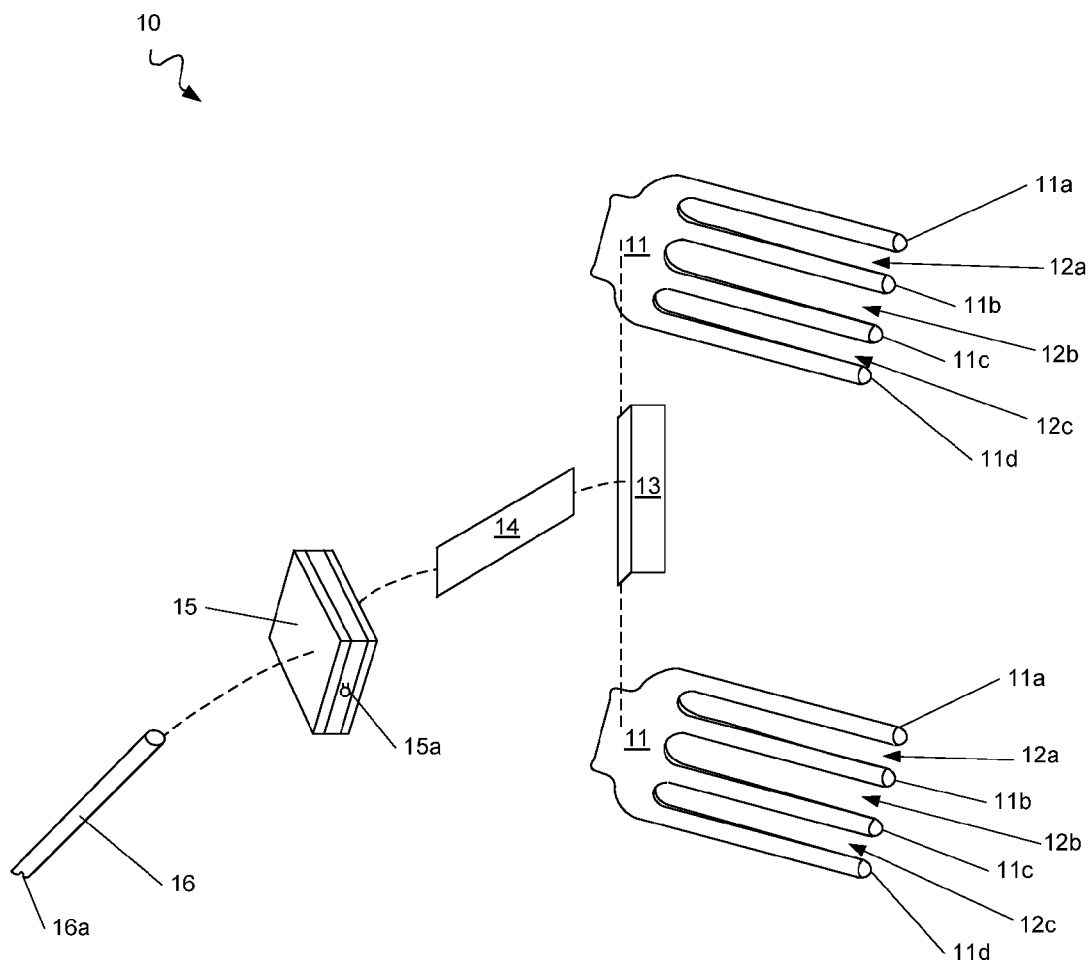
FIG. 1 is an exploded parts view of the portable water sport board rack, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 4.

As described throughout this document, the term "board" is used to describe water sport equipment such as water skis, wakeboards, surfboards, knee boards, paddle boards and any other such device which can be utilized on a boat and can benefit from being stored by the board rack disclosed herein.

As will be described below, the portable board rack can work in conjunction with one or more rod holders of a boat. As is known to those of skill in the art, conventional rod holders include an elongated channel that is typically at an angle of between 15 and 45 degrees relative to the top surface of the boats gunwale. Rod holders are extremely well known in the art, and include U.S. Pat. No. 4,778,141 to Bogar, the contents of which are incorporated herein by reference.

FIGS. 1-6 illustrate one embodiment of a portable water sport board rack 10 that is useful for understanding the inventive concepts disclosed herein. As will be described below, the rack 10 can function to receive a plurality of watersport boards and secure the same in a manner which allows the rack and board combination to be easily transported to and from a boat. The rack 10 also includes an angled rod for engaging the rod holder of a boat and a rotational device for orienting the rack in a plurality of different positions on the boat.

FIG. 1 illustrates an exploded parts view of one embodiment of the rack 10, which includes a pair of generally parallel forks 11 that are connected along the respective back ends via a cross member 13. An extension member 14 is interposed between the cross member and the top end of a rotational device 15, and an elongated angled rod 16 extends from the bottom end of the rotational device 15.

As shown, each of the forks 11 can include a plurality of individual prongs 11a, 11b, 11c and 11d which extend outward from the back end of the fork and define parallel spaces 12a, 12b and 12c, respectively. Each pair of the parallel spaces forming an elongated channel/shelf for receiving and storing a water sport board.

As described herein, each of the forks 11 can be constructed from any number of durable and resilient materials suitable for prolonged exposure to sun and water. Several non-limiting examples including aluminum, plastic, PVC and the like. Although not illustrated, each of the forks can be completely or partially coated in a relatively soft material such as rubber, for example, which can function to protect the boards against scratching, and increase the coefficient of friction between the boards and the rack 10, to prevent unintentional separation.

Figure 2:
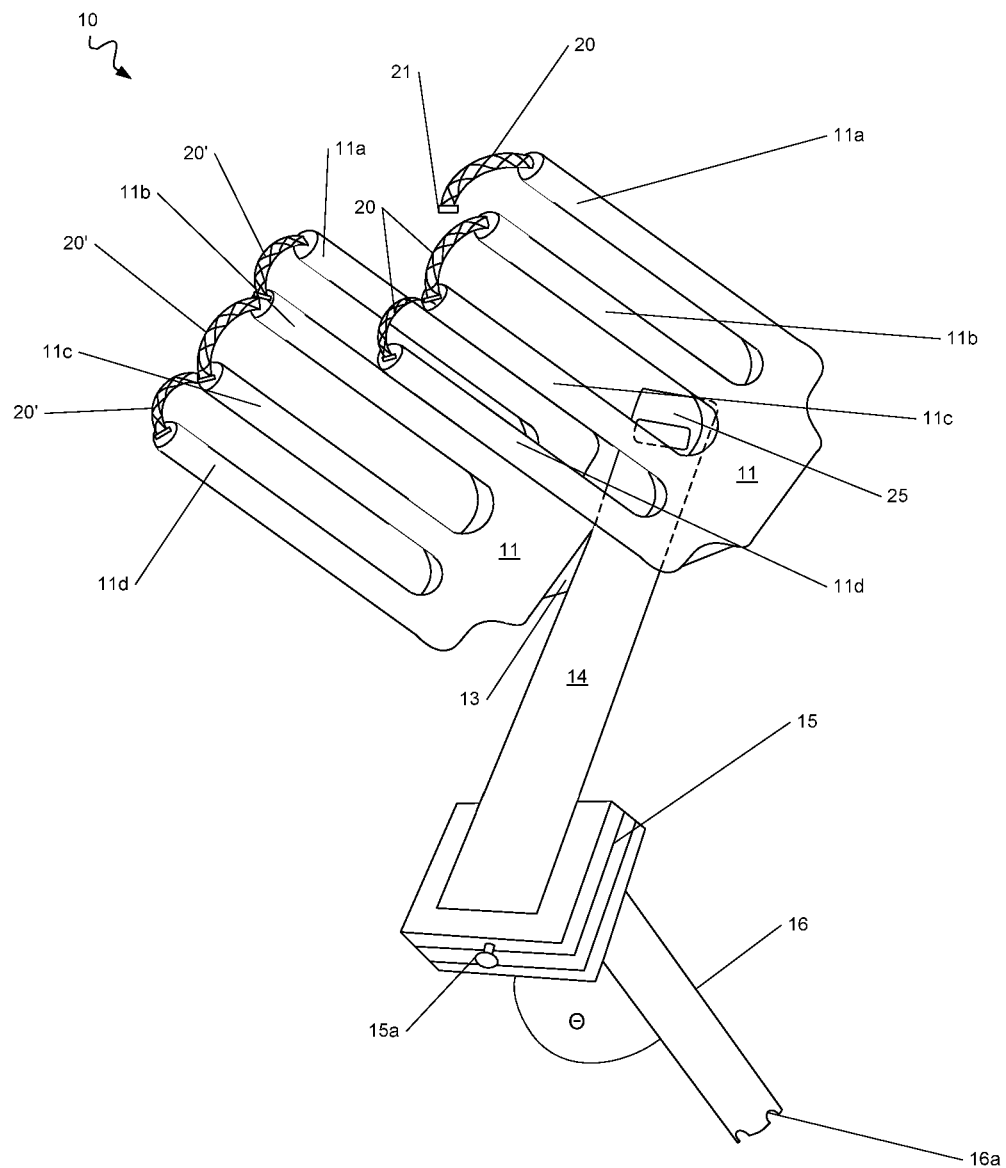
FIG. 2 is a perspective view of the portable water sport board rack, in accordance with one embodiment of the invention.
Figure 3A:
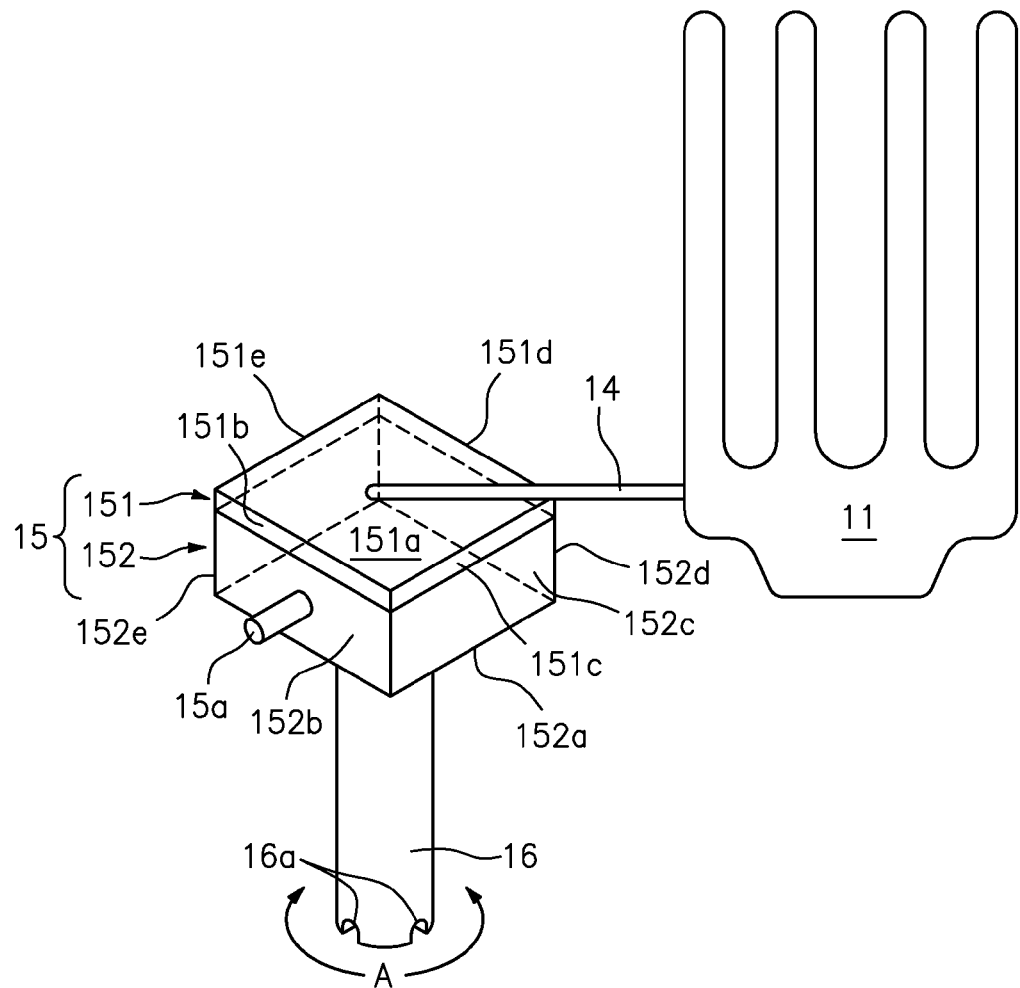
FIG. 3A is a side view of the portable water sport board rack demonstrating the operation of the rotational device.
Figure 3B:
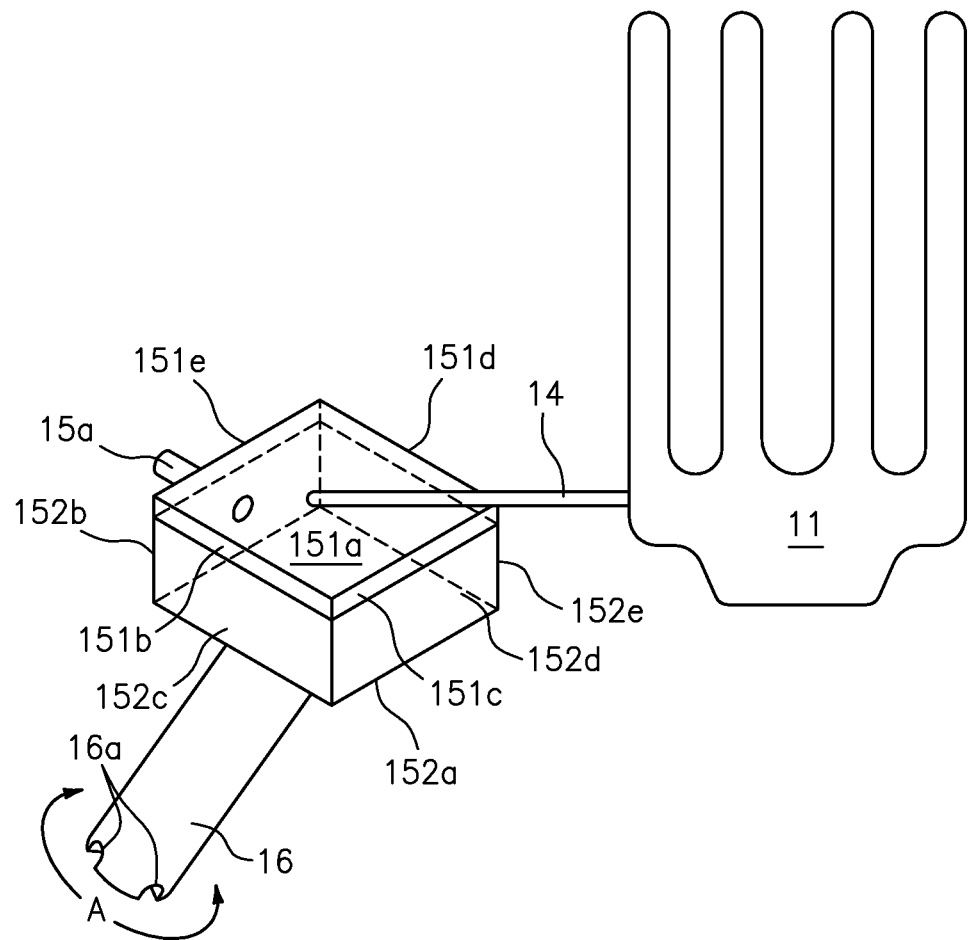
FIG. 3B is another side view of the portable water sport board rack demonstrating the operation of the rotational device.
Figure 3C:
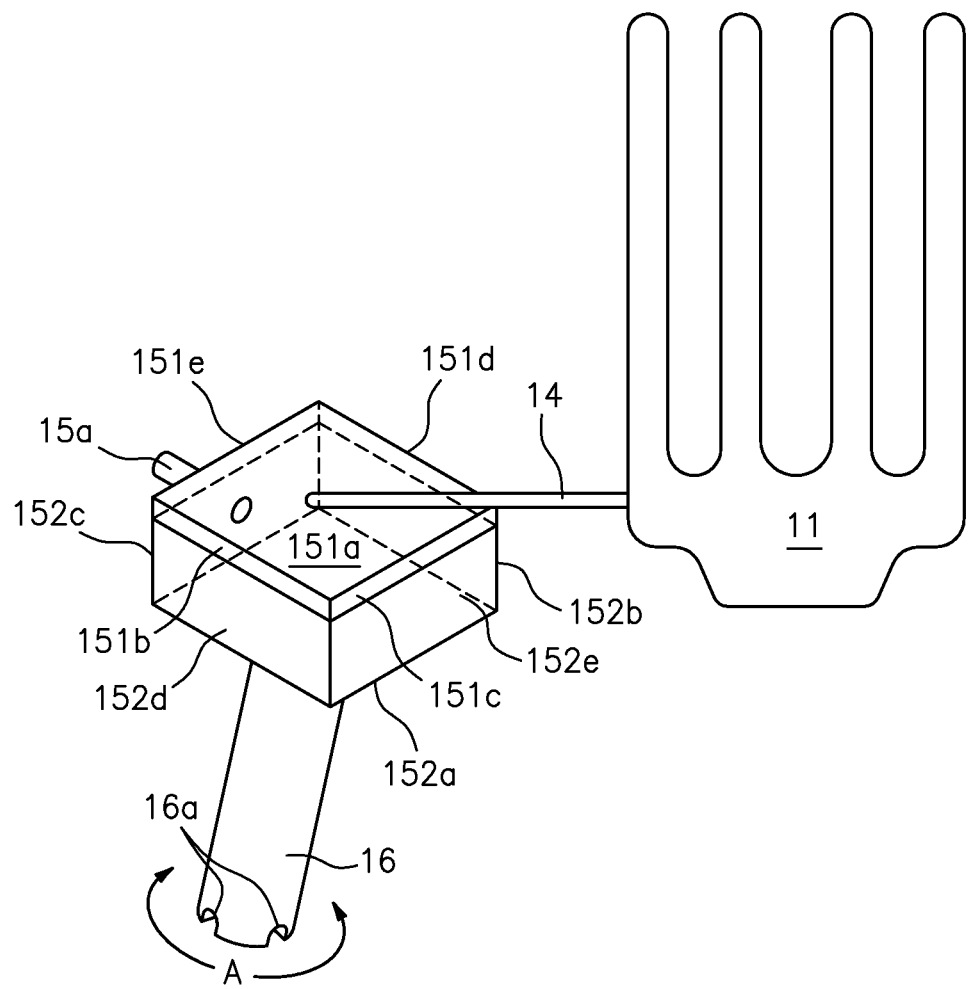
FIG. 3C is another side view of the portable water sport board rack demonstrating the operation of the rotational device.
Figure 3D:
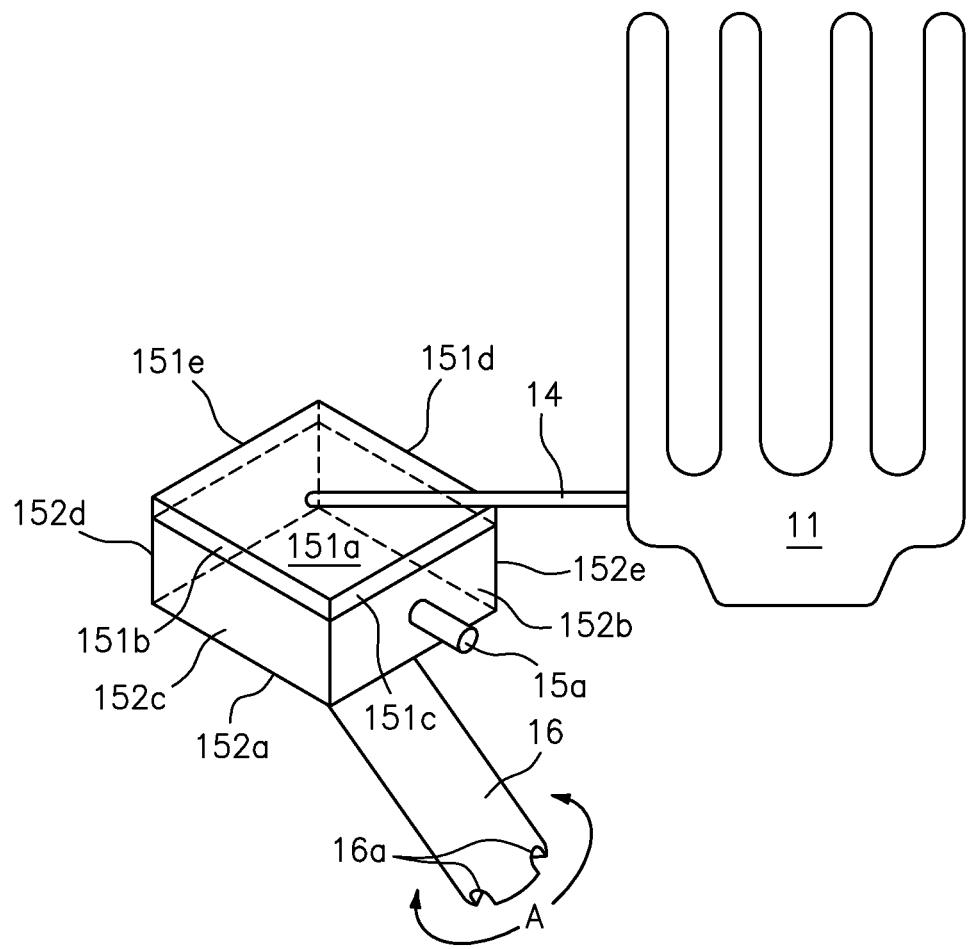
FIG. 3D is another side view of the portable water sport board rack demonstrating the operation of the rotational device.

As shown in FIG. 2, one embodiment of the device 10 can also include a plurality of straps 20 that are connected to each of the prongs at a distal end. Each of the straps can preferably be constructed from a durable material such as nylon, for example, and can be permanently affixed to one of the prongs at one end, and removably secured to an adjacent prong at a second end via a connector 21 such as a clip, snap or button, for example. Of course, any number of other known devices capable of securing the end of the strap to the end of the prong can also be utilized. Alternatively, or in conjunction with the straps 20, the device 10 can also include elastic band straps 20' which can be permanently affixed to two adjacent prongs and can also function to secure a board into a particular channel to prevent separation of the same.

In addition to the above, an optional carrying handle 25 can be connected to the top end of the cross member 13. The handle 25 can function to allow a user to easily carry the rack 10 and any boards located within the spaces 12a-12c, from one location to another. For ease of illustration, the straps 20 and handle 25 are omitted from the following illustrations; however, the invention is not to be construed as limiting in this regard.

The cross member 13 can function to connect each of the forks 11 together in a generally parallel orientation, so as to allow the formation of the spaces 12a-12c above. To this end, the cross member 13 can be connected to each of the forks at a generally perpendicular angle with respect to the prongs. In one preferred embodiment, the cross member 13 can include an elongated generally L-shaped member made from a strong waterproof material such as steel or aluminum, for example, however any number of other shapes and materials are also contemplated.

The extension member 14 functions to separate the forks 11 from the rotational device 15. To this end, the extension member 14 can be orthogonally connected to the middle section of the cross member 13 at one end, and to the top portion of the rotational device 15 at the other end. In the preferred embodiment, the extension member 14 can be constructed from an elongated generally planar member that is also made from a strong waterproof material such as steel or aluminum, for example, however any number of other shapes and materials are also contemplated.

As shown best in FIGS. 3A-3D, the rotational device 15 functions to rotate the forks 11 and/or the rod 16 about each other in a relative 360 degree manner (see arrows A). In the preferred embodiment, the rotational device 15 can comprise a rotating shot-pin locking mechanism such as that described in U.S. Pat. No. 3,802,297, the contents of which are incorporated herein by reference. As shown, the rotational device 15 can include a top plate 151 and a bottom plate 152 that are rotatably connected together. The top plate can include a generally planar top surface 151a having a plurality of side surfaces 15c2, 15c3, 15c4 and 15c5 extending downward therefrom. The bottom plate 15d can include a generally planar bottom surface 15d1 having a plurality of side surfaces 15d2, 15d3, 15d4 and 15d5 extending upward therefrom. In this regard, and as shown by the figures, the top and bottom plate can rotate 360 degrees horizontally with respect to one another, and the locking member 15a can secure the plates at any desirable position. Of course, any number of other devices such as a traditional ball and socket hinge with a locking pin, for example, that are capable of engaging and rotating each of the members 14 and 16 about each other in a controlled manner can also be utilized herein.

The angled rod 16 of the rack 10 can function to engage the rod holder 5 of a boat 1 by being inserted therein. As such, the rod 16 can preferably be made from an elongated generally tubular member having an outside diameter that is complementary to the inside diameter of a standard rod holder. Additionally, a plurality of notches 16a can be disposed along the bottom end of the rod 16. These notches functioning to engage the pin and/or shaft (not illustrated) that is traditionally found at the bottom end of a rod holder so as to prevent the inserted rack from twisting while in use. Such a feature can allow the portable rack 10 to be easily and quickly secured to the boat without the need for screws, nails or clamps which can damage the surface of the vessel. Moreover, this feature allows the rack and any installed water boards to be quickly removed from the boat and transported together to another location.

As will be known to those of skill in the art, most conventional rod holders include an inside diameter (i.e., opening) of approximately 1½ inches and are disposed within the gunwale at a vertical angle of approximately 30 degrees. As such, in one preferred embodiment, the rod 16 can include an outside diameter of 1⅜ inches, and can be connected to, and extend downward from the bottom end of the rotational device 15 at a relative angle θ of approximately 30 degrees to the bottom end of the device 15. Of course any number of other rod thicknesses and relative angles of between 0 and 90 degrees to the bottom of the rotational unit, for example, are also contemplated. In either instance, such a feature will enable the installed rack 10 in a position wherein each of the forks 11 are generally vertical (See FIG. 5), thus providing level shelves (12a-12c) for the water sport boards.

Figure 4:
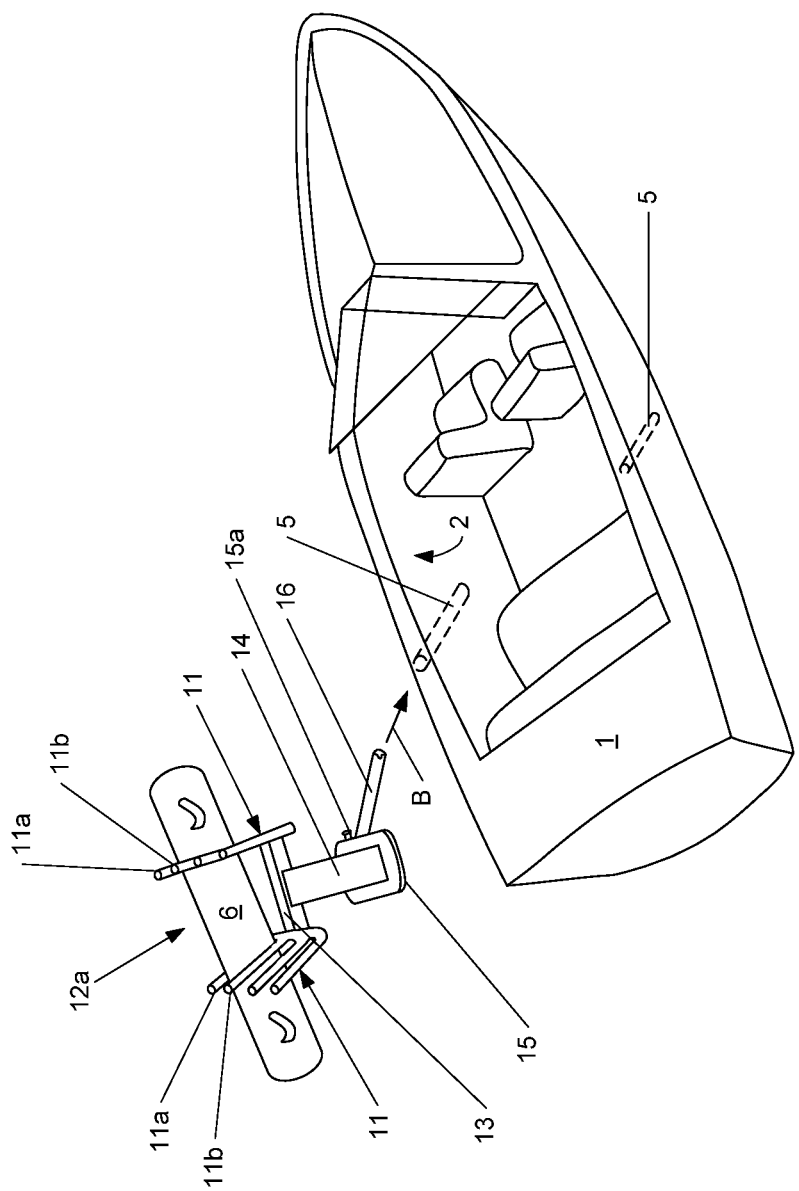
FIG. 4 is a perspective view of the portable water sport board rack in operation, and in accordance with one embodiment of the invention.

FIG. 4 illustrates one embodiment of the portable watersport board rack 10 in operation. As shown, any number of water sport boards 6 can be loaded onto the shelves 12a-12c, and the entire rack 10 can then be carried to the boat 1 as a single assembly. Of course, the boards can also be loaded at any time after installation. When arriving at the boat, the rod 16 can be inserted into any one of the boats rod holders 5 (see arrow B) that are typically found on the gunwale 2. Once placed within the rod holder, the weight of the rack 10 along with the notches 16a function to ensure the rack remains securely affixed to the boat without undue movement which could result in damage to the boat 1, the boards 6 and/or any boat occupants.

By providing the rod 16 at a substantially identical angle as the rod holder 5, the installed rack 10 will orient both the extension member 14 and the cross member 13 in a generally horizontal position, and will orient the forks 11 and the shelves 12a-12c in a generally vertical position, regardless of the angle provided by the rotational device 15. Such a feature allows easy access to the boards contained within the channels and allows the device to transition between numerous different positions while securely holding each of the boards.

Figure 5:
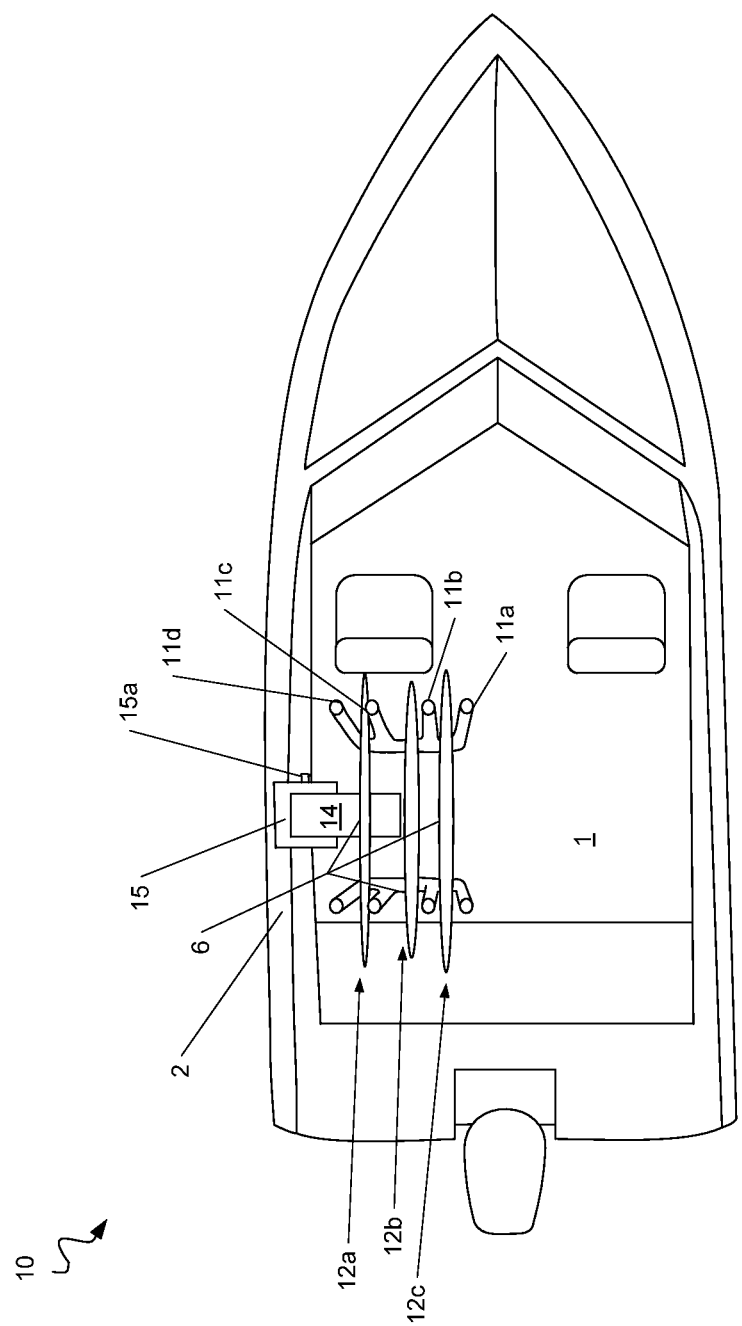
FIG. 5 is top view of the portable water sport board rack in operation, and in a closed orientation, in accordance with the one embodiment of the invention.

For example, FIG. 5 illustrates the device 10 in a closed/trailer position, wherein the rotational device 15 spins the forks 11 until the channels 12a-12c are located within the interior space of the boat. Such a feature advantageously allows the rack 10 and boards 6 to be secured within the boat for safe trailering to the water.

Figure 6:
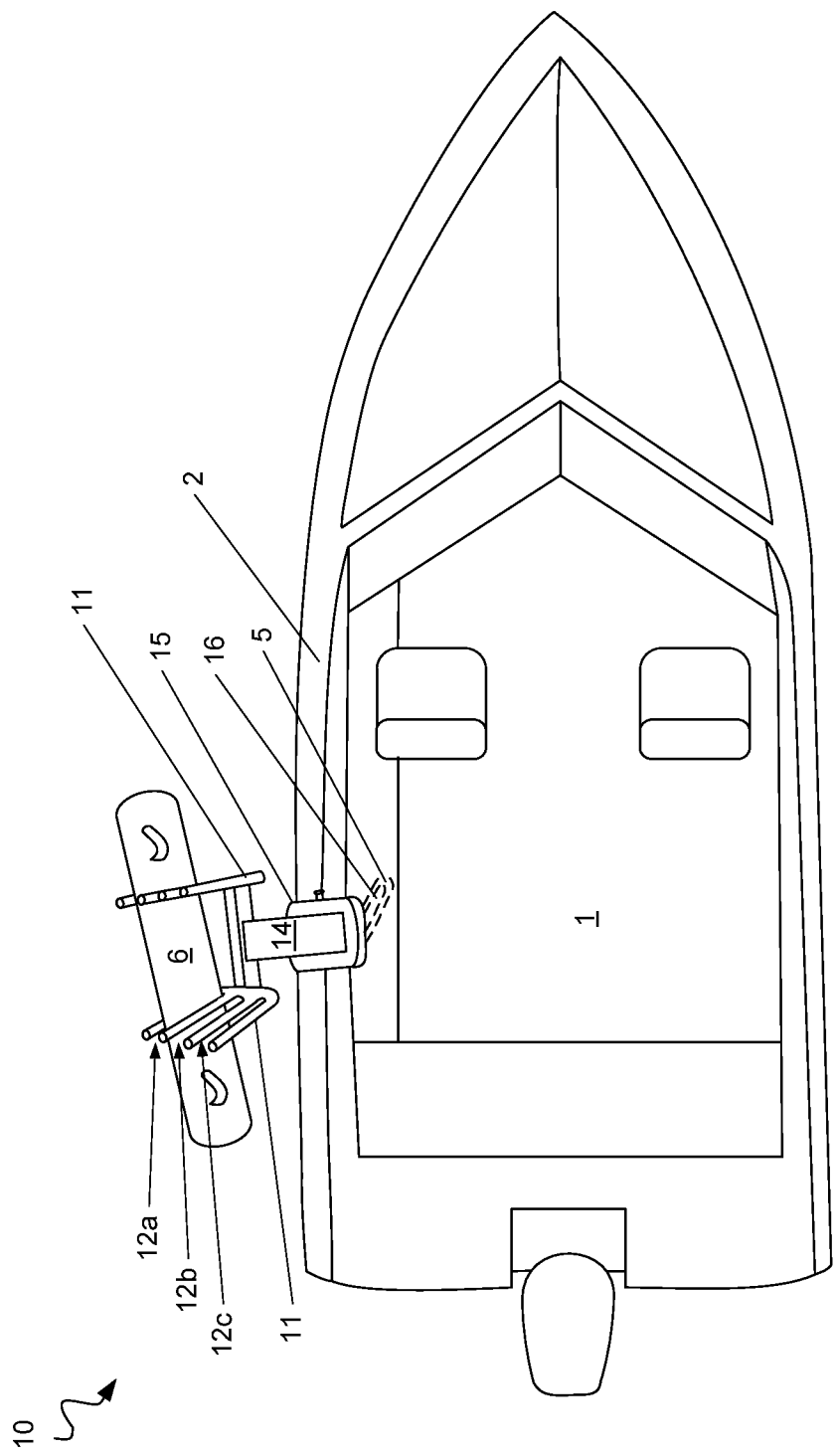
FIG. 6 is top view of the portable water sport board rack in operation, and in an open orientation, in accordance with the one embodiment of the invention.

As shown in FIG. 6, once the boat is on the water, the rotational device 15 can spin the forks 11 in either direction until the channels 12a-12c extend outward from the interior space of the boat. At this time, the rack 10 functions to store each of the one or more boards 6 in a secure manner that does not take up any usable space within the boat.

Figure 7:
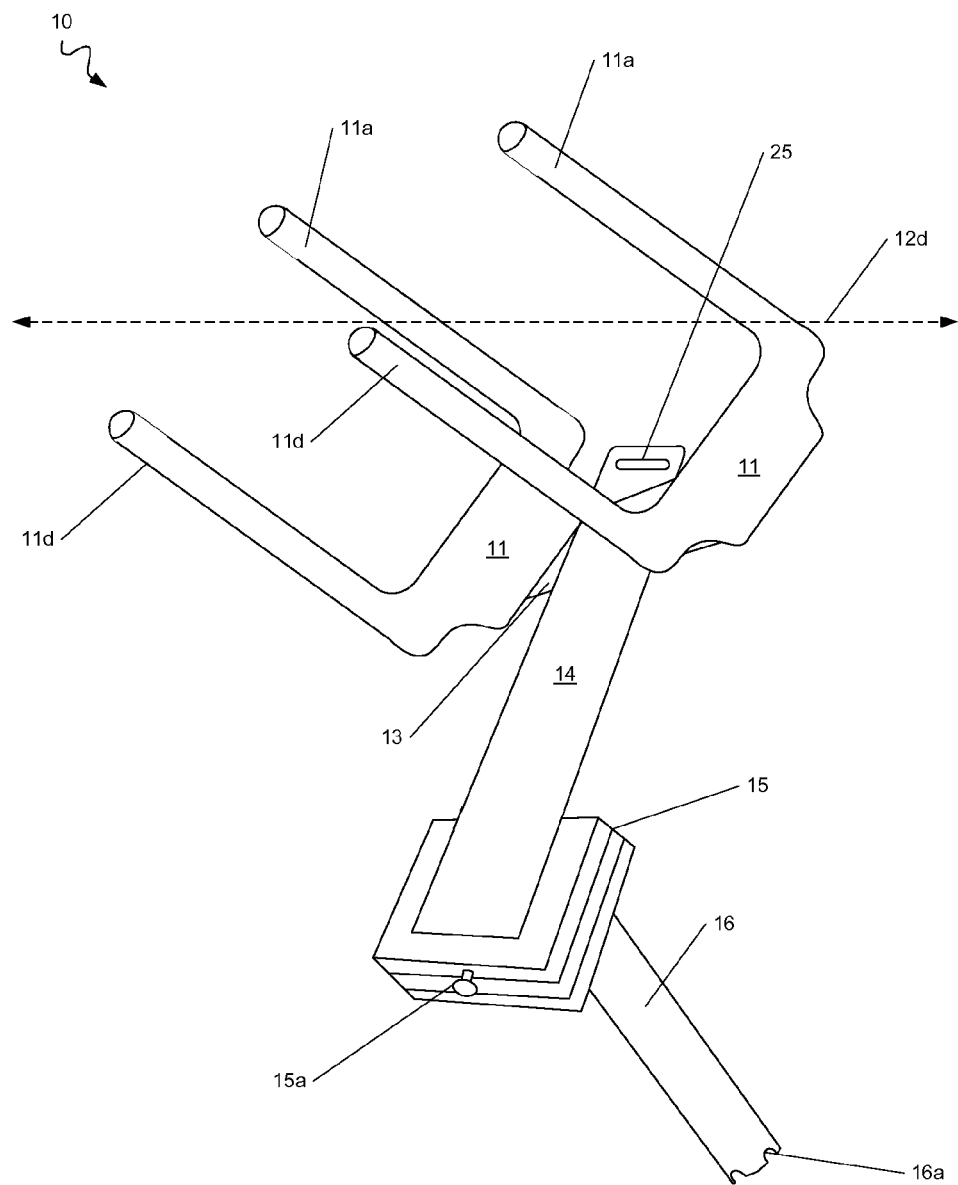
FIG. 7 is a perspective view of the portable water sport board rack, in accordance with another embodiment of the invention.

Although described above as including four prongs 11a-11d defining three distinct spaces 12a-12c, this is for illustrative purposes only, as any number of prongs defining any number of distinct spaces can be provided without deviating from the scope and spirit of the inventive concepts disclosed herein. To this end, FIG. 7 illustrates an alternate embodiment wherein each of the forks 11 include a pair of prongs 11a and 11d, each forming a single space 12d for receiving and storing a single board. Such a feature can be beneficial for use with heavy and/or thick water-sport boards such as kneeboards, paddle boards and the like.

Figure 8:
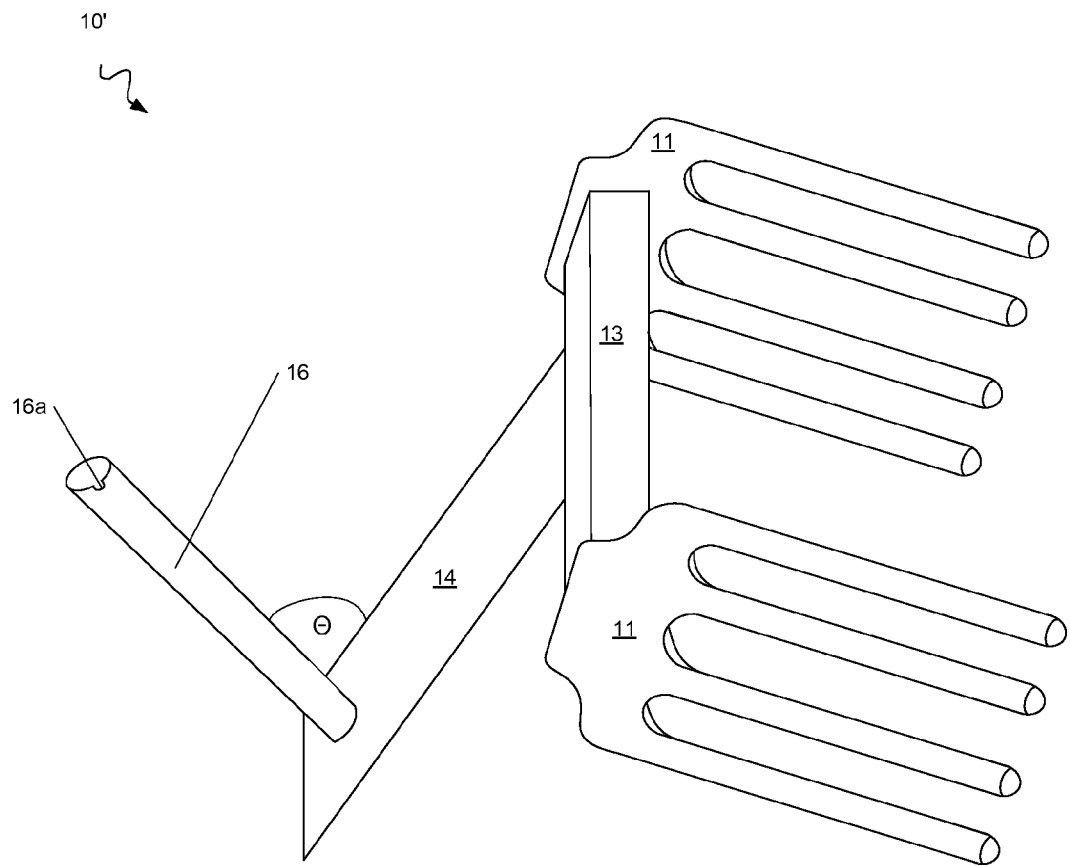
FIG. 8 is a perspective view of the portable water sport board rack, in accordance with yet another embodiment of the invention.

FIG. 8 illustrates another alternate embodiment of the portable board rack. As shown, the rack 10' can include each of the features 11-14, and 16 described above, without including the rotational unit 15. In this regard, the rod 16 can be secured directly to the second end of the extension member 14 at any angle θ, as described above and at any location across the 360 degree axis that is illustrated in FIGS. 3A-3D. Accordingly, by removing the rotational unit, the device 10' can be constructed as a unitary element thereby reducing manufacturing costs. Moreover, the device can still function in much the same way as the device 10, wherein the user lifts and rotates the assembled unit 10' to the desired orientation before placing it back within the rod holder 5 of the boat 1.

Accordingly, by providing a novel rack 10 which can transport and store one or more water sport boards 6 utilizing a single rod 16 and a single rod holder 5, the presently claimed invention is especially advantageous for use with small boats 1 and other such watercraft which do not have the space or features that are required by the more traditional racks.

As described herein, one or more elements of the portable water sport board rack 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the forks 11, the cross member 13, the extension member 14, and/or the optional handle 25, including all sub components, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable water sport board rack, comprising:
   a pair of parallel forks, each including a plurality of coplanar prongs extending outward therefrom and defining one or more channels that are configured to receive a water sport board;
   a cross member having a first end that is connected to one of the parallel forks, a middle portion, and a second end that is secured to the other parallel fork;
   a rotational unit having a top surface, a bottom surface and a locking member;
   an extension member having a first end that is connected to the middle portion of the cross member and a second end that is connected to the top surface of the locking member; and
   an elongated rod having a first end that is secured to the bottom surface of the rotational unit at a first angle, and a second end having a shape and dimension that is complementary to a shape and dimension of a boat rod holder.

2. The rack of claim 1, wherein the top and bottom surfaces of the rotational device are rotatably engaged and are configured to rotate about each other in a 360 degree relative manner.

3. The rack of claim 2, wherein the locking member functions to prevent rotation of the rotational device when engaged.

4. The rack of claim 1, wherein the rotational device comprises a rotating shot-pin locking mechanism.

5. The rack of claim 1, wherein the rotational device is configured to transition the rack between a closed position wherein the forks are located within an interior section of a boat, and an open position wherein the forks are not located within an interior section of a boat.

6. The rack of claim 5, wherein the rotational unit is further configured to maintain the forks in a vertical position and the extension member in a horizontal position when the device is in each of the open position and the closed position.

7. The rack of claim 1, further comprising:
   a plurality of notches that are disposed along the second end of the rod, said notches being configured to engage a locking pin of the rod holder to prevent rotation of the device.

8. The rack of claim 1, wherein said angle is approximately 30 degrees relative to the bottom surface of the rotational unit.

9. The rack of claim 1, wherein said angle is between approximately 0 and 90 degrees relative to the bottom surface of the rotational unit.

10. The rack of claim 1, further comprising:
    a carrying handle that is disposed along the cross member.

11. The rack of claim 1, further comprising:
    a plurality of straps that are interposed between each of the prongs along a distal end.

12. The rack of claim 11, wherein at least one of the straps further includes a connector that is configured to repeatedly engage and disengage an adjacent prong.

13. The rack of claim 11, wherein at least one of the straps is constructed from an elastic material that is permanently secured to a pair of adjacent prongs at each end.

14. The rack of claim 1, wherein each of the parallel forks includes four individual prongs defining three parallel channels.

* * * * *